Nov. 30, 1965  K. W. MILLER  3,220,278
FLEXIBLE WORM DRIVE
Filed Aug. 7, 1963  3 Sheets-Sheet 1
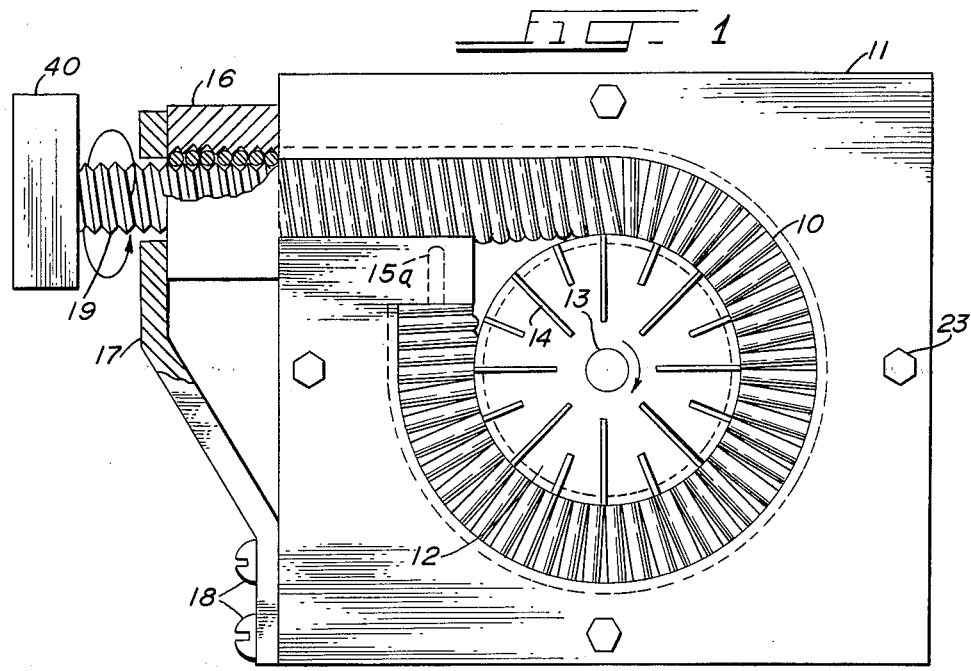
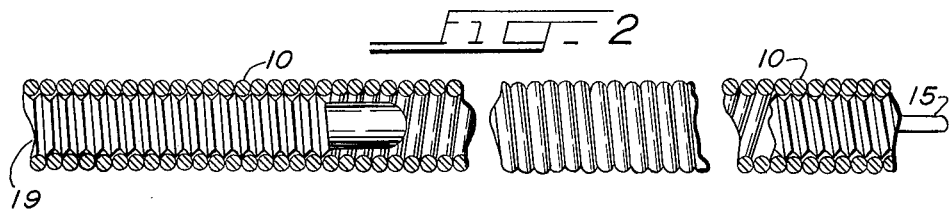
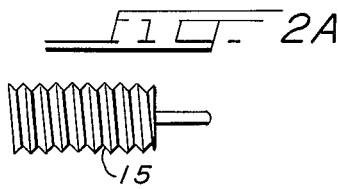
INVENTOR.
KENNETH WILLIAM MILLER
BY James W. DeLimont
ATTY.

Nov. 30, 1965  K. W. MILLER  3,220,278
FLEXIBLE WORM DRIVE
Filed Aug. 7, 1963  3 Sheets-Sheet 2
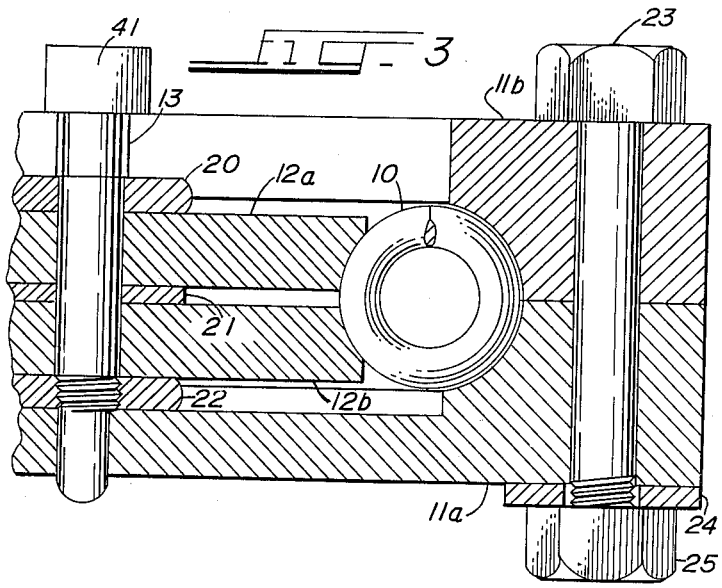
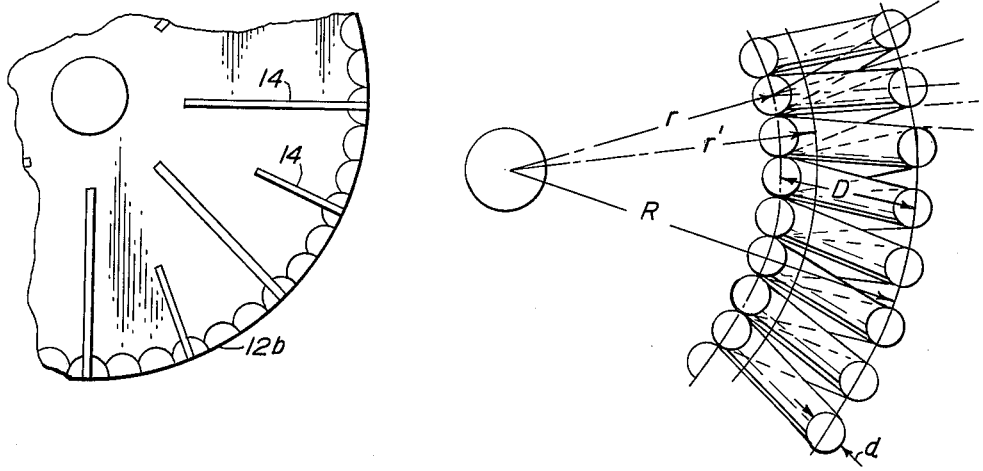
INVENTOR.
KENNETH WILLIAM MILLER
BY James W. DeSimone
ATTY.

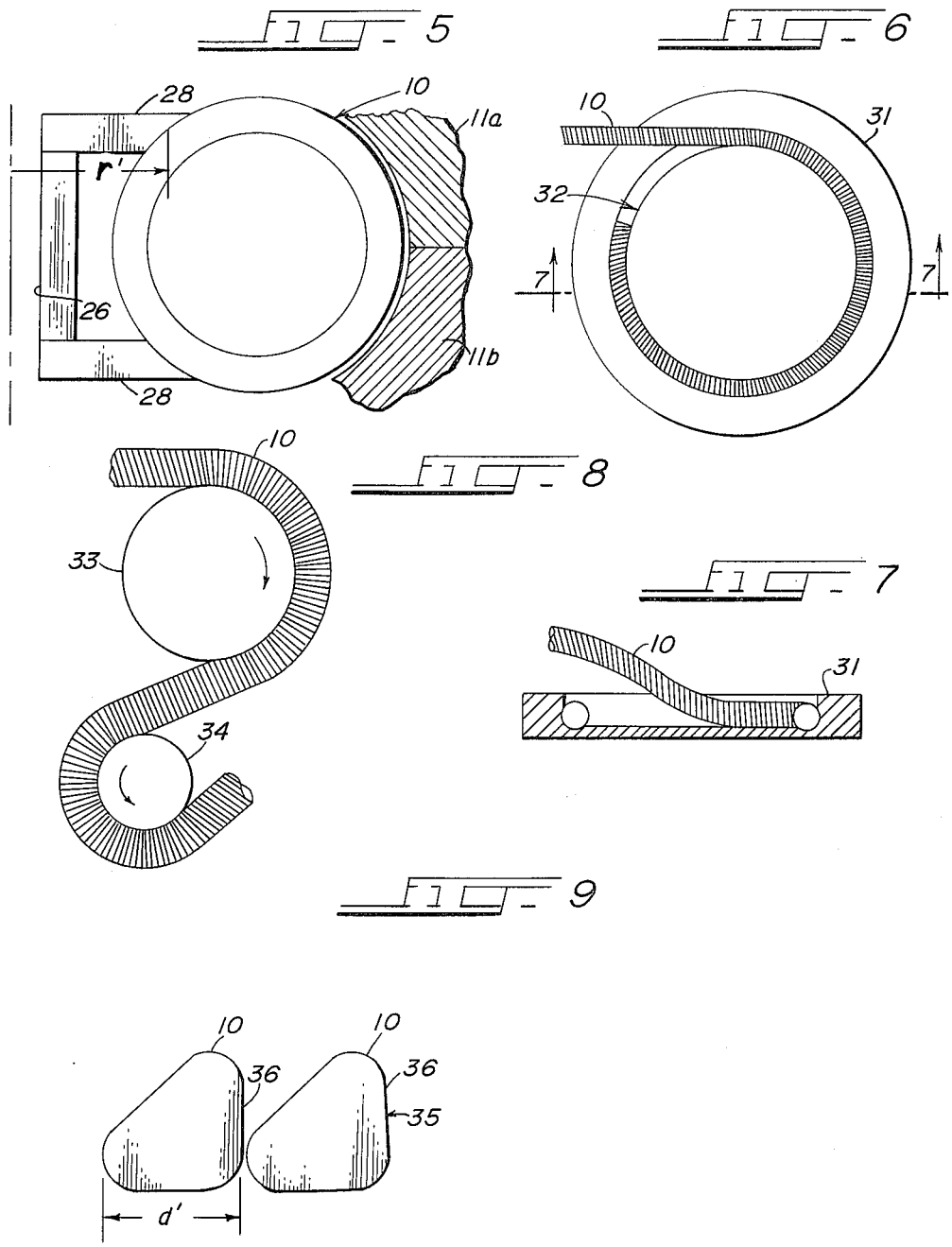

United States Patent Office 3,220,278
Patented Nov. 30, 1965

3,220,278
FLEXIBLE WORM DRIVE
Kenneth William Miller, Chicago, Ill., assignor to IIT Research Institute, Chicago, Ill., a corporation of Illinois
Filed Aug. 7, 1963, Ser. No. 300,486
17 Claims. (Cl. 74—425)

This invention is directed to mechanical drives and more particularly, a flexible worm gear drive.

A need exists for an improved drive system of low-cost and reliable operation, especially for low-speed drives. For example, the state of the art in magnetic recording, both in heads and magnetic tape, is making possible, slower and slower tape speeds while retaining adequate frequency response for the intended applications. On the other hand, mechanical limitations are being encountered in the provision of economic, commercially-practical low-speed capstan drives which are sufficiently free from "wow" and "flutter" to equal the quality which can now be built into the associated recording equipment. Also, in most existing drives relatively massive flywheels are used as energy storage devices to average out velocity fluctuations.

Accordingly, it is an object of this invention to provide an improved mechanical drive. Another object of this invention is to provide a novel flexible worm gear drive. Yet another object of this invention is to provide an improved novel flexible worm drive which is low in cost and reliable in operation and provides continuous rotational motion. Still another object of this invention is to provide a novel flexible worm drive wherein a need of a flywheel to stabilize rotational velocity is obviated by direct coupling of the drive to the motor. Yet still another object of this invention is to provide a flexible worm gear drive wherein a resilient gear is employed to compensate for errors in the drive. A further object of this invention is to provide a novel flexible worm gear drive wherein the flexible worm is a coiled spring. Still a further object of this invention is to provide a novel flexible worm gear drive wherein the flexible worm is a coiled spring with a non-circular wire cross-section. Yet still a further object of this invention is to provide a novel flexible worm gear drive wherein the flexible worm is a coiled spring wherein the axis of said spring is in several planes. And yet still a further object of this invention is to provide a novel flexible worm gear drive wherein the flexible worm is a coiled spring mating with several resilient gears to drive said gears in opposite directions.

The foregoing and other objects of this invention will become more apparent to the reader from the following description and accompanying drawings in which:

FIGURE 1 is a top view, partly in section of a drive constructed in accordance with the teachings and practices of the instant invention;

FIGURE 2 is a view, partly in section of the flexible worm and its associated thrust bearings;

FIGURE 2a is a view of thrust guide bearing pin 15;

FIGURE 3 is a partial side sectional view of the assembly of FIGURE 1;

FIGURE 3a is a partial view in plan of gear 12b;

FIGURE 4 is a partial diagrammatic illustration of spring 10, useful in describing this invention;

FIGURE 5 is a partial cross-section of an alternative embodiment;

FIGURE 6 illustrates another embodiment;

FIGURE 7 is a side view of FIGURE 6 looking in the direction of arrows 7—7;

FIGURE 8 is a view of yet another embodiment; and

FIGURE 9 illustrates the preferred cross-section of the wire of spring 10.

Before discussing the invention in detail, it is believed useful to briefly describe the principles utilized. It is well known in ruling engines, that errors in a straight screw-drive can be compensated or greatly reduced in effect by use of a long cork nut. This nut is elastically resilient and sufficiently long to average out the periodic and random errors of the screw thread. It is proposed to apply this technique upon a worm gear drive. Moreover, instead of trying to reduce velocity harmonics in the driven shaft by flywheel effect at slow rotational velocities, the present drive is directly coupled to the rotor of a high-speed fractional horsepower motor which acts itself as the flywheel. The stored energy and stored angular momentum of the rotor at high rotational speeds are both relatively large and considering the large gear ratio of screw gear as a speed-impedance transformer, are equivalent to a relatively large slowly rotating flywheel attached to the worm driven shaft. Additionally, the present invention enables the fabrication of great quantities of duplicate drive systems at relatively low cost.

All of these advantages are achieved by the use of a close coiled spring which functions as a long flexible worm gear making engagement around a major fraction of circumference of a circumferentially resilient mating gear. It is this mating gear and/or the coiled spring which act effectively as the long cork nut previously referred to and, by the arrangements to be described provide a continuous rotational driving force.

Referring now in more detail to FIGURES 1, 2, 2a and 3, a right hand helically coiled spring 10 is carried in a properly contoured recess in housing 11. Housing 11 is split in two halves, 11a and 11b, along the mid-plane of spring 10 with the annular recess of housing 11 being shaped as the outer surface of a circular torus and cylinder respectively for the three-fourths circumference and end tangential portions of spring 10. By this design, easy assembly of housing 11 around all working parts is achieved.

Spring 10 is provided at one end with a terminal bearing pin 15, and at its other end with a long screw rod 19. Both pin 15 and screw rod 19 may be of standard screw thread with pitch and diameter both slightly greater, but not less, than the pitch and effective internal thread diameter of spring 10. The inner ends of these threaded parts are tapered slightly to avoid abrupt stress-raising shoulders or discontinuities in bending action of spring 10. When pin 15 and screw rod 19 are screwed into place, they are of proper length to stiffen the straight tangential portions of spring 10 in the coiled working configuration illustrated in FIGURE 1.

The left end of spring 10 is covered by an overriding nut 16, which screws onto rod 19 and also over the end of spring 10 to act simultaneously as a lock nut and a pinch nut on the outside end turns of spring 10. That is, the enlarged threaded portion in nut 16 is tapered to the right so it will "pinch" spring 10 and cause nut 16 to rotate in unison therewith. Also, nut 16 and rod 19 have the same actual axial pitch. When spring 10 is assembled in housing 11 it is prevented from moving along its own axis by nut 16 and pin 15, both acting as thrust guide bearings. Plate 17 is provided to urge nut 16 against the face of housing 11 and fix its position. Plate 17 is rigidly secured to housing 11 by screws 18, but is arranged to nevertheless permit nut 16 to rotate with spring 10. Similarly, plate 17 may be omitted if housing 11 is properly contoured to retain nut 16. Depending on the composition of nut 16, plate 17 and housing 11, it may be necessary to provide a bearing or lubrication at their interfaces.

As viewed from the left in FIGURE 1, screw rod 19 is preferably rotated counter clockwise to cause shaft 13 to rotate in a clockwise direction looking into the plane of the drawing. This direction of twist has four incidental advantages; namely, (1) it tends to tighten spring 10 on driving rod 19 at the left end (FIGURE 1) due to friction of rotation of spring 10, (2) whether or not spring 10 is closely wound, it tends to prevent diametrical expansion and binding of spring 10 within its snugly fitted housing, (3) spring 10 pushes—not pulls—the mating gearf 12 causing nut 16 to carry much of the reaction thrust of worm action and thus relieve pin 15 of all but light duty, and (4) spring 10 itself will be under compressive forces along its own straight or curved axis preventing a change in its length to obviate mis-match of tooth pitch of spring 10 and mating gear 12.

It is preferable to avoid vibration of spring 10 as a whole along its own axis. To insure this, nut 16 should be smoothly functional as a thrust bearing; it and spring-wrapped screw rod 19 should be accurately seated and guided against axial movement or lateral wobble at the drive end. Likewise, at the pivot end (the opposite or terminal end) spring 10 should turn smoothly without wobble or end-wise chatter. To this end, pin 15 is accurately seated in bore 15a of housing 11.

FIGURE 3 shows details of mating gear 12. Preferably, gear 12 is actually two identical gears 12a and 12b reversed and face-to-face but separated by washer 21. When assembled as shown on shaft 13 and gripped between positioning washer 20 and nut 22, the outer periphery of gears 12a and 12b will be elastically deflected laterally slightly so as to make snug, but not tight, contact with the convolutions of spring 19. To assist this flexibility, in addition to enhancing circumferential compliance, gears 12a and 12b may be constructed with radial slots 14. In this way, wow and flutter is isolated from load 41 coupled to shaft 13.

Alternatively, this gear can be a one piece disk of a foamed or otherwise compliant plastic.

To avoid fluid lubrication, molded Teflon or nylon may be chosen for gears 12a and 12b although metal gears would function equally as well provided they are radially slotted (14, FIGURE 3a) to make them more resilient circumferentially. Such gears may be mass produced from one initial die. Spring 10 can be produced from extremely long lengths and then cut to specific size. To isolate motor vibration, the motor drive may be direct through a short length of flexible rubber coupling in power source 40 to the left hand end of screw rod 19 in FIGURE 1.

The axis of coiled spring 10 need not lie in a single plane. FIGURES 6 and 7 show schematically how inside ring gear 31 is driven by coiled spring 10. Inside positioning idling drum 32 may be used but is unnecessary if the two ends of spring 10 are fixed as in the embodiment of FIGURE 1, since then spring 10 tends to straighten out. In other words, during rotation and driving forces, the spring will tend to assume a larger radius.

An incidental advantage of this design is that, although the axial-circumferential length of spring 10 may be fixed (close-coiled side of spring 10, FIGURE 4), the outer side of spring 10 is opened between turns to provide tangential elastic compliance in addition to more room for better shaped teeth on mating ring gear 31. Of course, the driven unit is coupled to gear 31, but such coupling is not shown in the figures as it will be obvious to those skilled in the art.

Similarly, coiled spring 10 need not be bent at the same radius nor be without reverse bends, as is illustrated in FIGURE 8. Gears 33 and 34 driven by spring 10 may or may not be in the same plane and in the illustrated embodiment are contra-rotating. The embodiment of FIGURE 8 would be suitably housed in the manner illustrated in FIGURE 1 and would have fixed ends with thrust bearings of the type described with respect to FIGURE 1. Moreover in FIGURE 8, the driven gears, 33 and 34, need not be in the same plane nor even in parallel planes.

The spring, FIGURE 2, in its straight and relaxed condition may be "close wound" as shown, or slightly open or separated between adjacent turns. Depending upon intended service there are advantages and disadvantages to either alternative.

When precise rotational speed of the driven gear pair 12a and 12b and is associated shaft 13, FIGURE 3 is desired, then an initially close wound spring may be used. In this case turns are in contact along the straight tangential sections and also make contact at the inside of the circular arc bend as is evident from FIGURES 1 and 4. Consequently, since the spring is radially or laterally snugly confined between the housing 11a, 11b and the gears 12a, 12b, FIGURE 3, and if thrust pin 15 and collar 16 are properly seated in housing 11 to prevent circumferential backlash of the spring, then no rotational chatter of the gear shaft combination 12–13 is possible. Moreover, in this case, by providing circumferential elastic compliance into the gear pair, 12a, 12b and/or into the drive spring, as hereinafter described, the long resilient nut principle will be operative over ¾ of the arc around the driven gear pair 12a, 12b (FIGURE 3). This feature averages out slight imperfections of pitch and contours of spring turns and gear teeth thereby practically eliminating "wow" and "flutter" of the driven shaft 13.

There are two minor disadvantages of the choice of initially close wound spring. Neither is serious and both may be minimized. As is apparent by comparing FIGURES 3a and 4, the gear teeth will have sharp top edges and narrow driving flank areas of unfavorable non-constant angle if the spring wire is of circular cross-section and turns are in contact at the inside of the circular bend, radius $r$. However, in this flexible worm drive many gear teeth are in contact between spring worm and gear over a long arc. Forces are shared by many teeth and in many applications the total torque to be transferred between worm and gear is small anyway.

Nevertheless, it is practical and feasible to draw or roll metal wire or to extrude plastic wire to a rounded-corner-triangular section as indicated in FIGURE 9 and subsequently wind it upon a mandrel so that the upper corners (FIGURE 9) are on the outside of the bend (FIGURE 4). In such case the gear tooth profile 12b, FIGURE 3a, will be more favorable. In addition the worm-gear interface on the drive surfaces—face 36 on the wire FIGURE 9—will be radial or normal to the circumferential tooth forces at the inside of the circular worm-to-gear intermesh pitch circle.

The other slight disadvantage of initially or relaxed close-coiled spring is the added pressure, turn-to-turn, at the inside of the bend, radius $r$, FIGURE 4, in operating position. Elastic area of contact between turns is small (theoretically zero area or point contact for infinitely rigid material). This is a rolling (not sliding) contact, yet some wear will take place in prolonged operation and none is desired. However, if the helical spring is fabricated with small—almost zero—turn-to-turn pressure and if the ratio of spring diameter to inside bend radius $D/r$, FIGURE 4, and ratio of spring diameter to wire diameter, $D/d$, (or effective diameter of triangular wire, $d$, FIGURE 9) are judiciously chosen, then turn-to-turn pressure on the inside of the bend, radius $r$ can be minimized and made comparable to the circumferential driving pressures of operation which are cumulatively shared around the worm-to-gear ¾ circular arc.

Some of these disadvantages can be still further reduced or eliminated by winding spring 10 slightly open between turns in relaxed condition so that when bent to inside radius, $r$, FIGURE 4 turns just barely make turn-to-turn contact at the inside of the bend with little or ideally zero pressure. If, then, the pitch of the external threads on the internal rods, 19 and 15, FIGURES 2 and 2a are such as to hold the straight portions of the spring in turn-to-turn contact, and if, further, the assembly when in operating position as in FIGURE 1, is under slight axial compression just adequate to close up spaces turn-to-turn at and near the tangential points of straight end to arc sections, then the spring worm will operate as a whole with no location where turn-to-turn contact does not exist. This construction preserves a fixed end-to-end straight plus arc length between thrust bearings, pin 15 and nut 16, by turn-to-turn contact everywhere although the free spring in straight relaxed condition is fabricated slightly open between turns. Thus all of the advantages already described for the closed coil spring are retained plus some advantage in reduced turn-to-turn pressure on the small area of contact at the inside radius, $r$, FIGURE 4 of arc bend.

As a third alternative the spring may be fabricated and operated both everywhere open coil nowhere contacting turn-to-turn. This will reduce the required precision of mating gear teeth and perhaps reduce slightly the cost of manufacture. However, the long nut averaging principle of operation would be sacrificed. Also near the tangency points, small lengths of straight open turn coil, which of necessity must remain unfixed by the internal threaded rods, will permit elastic circumferential displacement of the driven gear, 12, or even resonant torsional vibration of this gear and associated drive shaft 13. For some applications this could be highly undesirable.

Most practical considerations taken into account usually favor operation of the flexible worm gear with springs making turn-to-turn contact everywhere throughout the entire length offer assembly and during operation as shown in FIGURES 1 and 4, whether or not the spring as fabricated and free is closed or slightly open coil.

In FIGURE 9, spring 10 is shown with the preferred non-circular wire cross section. Wires of triangular shape with rounded corners have the best elastic properties and optimum uniformity of cross section. For a given wire width $d'$, in the axial direction and when close wound (and on the close wound side when bent) triangular cross section shapes permit much better tooth profiles on mating gears 12. The tooth shape of FIGURE 9 has a flat face 36, normal along the pitch circle to the mating gear teeth. This is best to transfer torque to mating gear 12 since, for intended service, motion and tooth interface pressure will be in the direction of arrow 35.

Triangular wire shapes have still other advantages. Excess metal in spring 10 is reduced. The polar moment of inertia for the cross sectional area is decreased—both in terms of increased width $d$.

Having explained how and why it is preferable to operate the flexible spring worm 10 with every turn everywhere in contact with adjacent turns (at the inside of the bend of the circular arc portion) it is appropriate to explain in more detail how the long nut resilient error averaging principle is accomplished. This may be done in two ways: either in the gear 12a, 12b itself, or in the spring 10. Of course both methods can be used in combination.

In the first case gear pair 12a, 12b (or a single piece equivalent) may be made of foamed plastic, paper, or cardboard, or any other material volumetrically elastic or resilient similar to cork. Alternatively and/or in combination the gear pair of equivalent single gear may be radially slotted as shown, in FIGURE 3a. If the gear(s) are metal, slotting may be necessary for adequate circumferential resilience. In this case the individual gear teeth themselves and/or multiple gear sections between radial slots, will deflect circumferentially so that the gear 12, as a whole, and its associated shaft 13, will take up an average position, or average rotational velocity, in which individual errors in gear teeth etc. are averaged out over a long circumferential arc. This is the long nut principle adapted to a circular configuration.

Alternatively, with a spring worm, it is practical to introduce the circumferential compliance and error averaging principle into the spring worm even though the arc length of the worm as a whole is of fixed length and position due to turn-to-turn contact at the inside of the arc bend and fixed position of end thrust bearings; indeed even because of this and even although the mating gear 12 may be rigid. To see how this is accomplished, reference is made to FIGURE 5. In this alternative the twin gear halves 28 have been made thinner in section and larger in radius and more widely separated by a tube 26 (or integral spool case) so that they mesh with the spring worm 10 at a larger effective radius $r'$. But, referring to FIGURE 4, we note that wire turns are not in mutual turn-to-turn contact at radius, $r'$, even although, by preference, all turns are in mutual contact along the radius $r$, of inside circular bend of the spring. Individual wire turns are free to rotate elastically (slightly) about the circle of mutual turn contact of radius $r$, so that they become (slightly) unevenly spaced or separated along their open outer circle of radius, $r$. In this manner individual small errors of tooth or wire profile or pitch at the effective radius $r'$ between gear 28, and spring worm 10, are averaged out over a long arc even though the gear 28 may be circumferentially rigid. The long resilient nut principle is thereby built into the spring.

Gear pair 28 need not be rigid. It may have flexible flanges which can elastically flex laterally and/or it may be circumferentially resilient also by choice of foamed material, by radial slotting or otherwise. In such case circumferential compliance or the long nut principle may be shared by both spring worm 10 and gear 28 when this alternative construction is used over a long circular arc as in FIGURE 1.

It will be obvious to those skilled in the art that in addition to the error averaging and reducing long nut principle accomplished by my invention, back-lash is completely eliminated in the alternative preferred embodiments as described.

The large speed reduction offered by one simple gear as disclosed by this invention is very impressive. Furthermore, the versatility of this invention is demonstrated by reference to the following numerical examples. Since this invention lends itself to tape drives the following example is with reference thereto.

In Table I, tape speed is related to capstan size (diameter of shaft in load 41 at its driving point). Similarly, Table II relates spring coil worm wire size to number of teeth of mating gear 12 (identical to the worm gear ratio) and the corresponding capstan rotational speed for a 3500 r.p.m. motor. These tables can both be proportioned for other diameters, etc., of these parts.

TABLE I

*Rotational speed of 1-inch diameter capstan*

| Tape speed, inches/sec.: | Revolutions per second |
|---|---|
| 15.0 | 4.7746 |
| 7.5 | 2.3873 |
| 3.75 | 1.1937 |
| 1⅞ = 1.875 | .5968 |
| 15/16 = 0.9875 | .2984 |
| 15/32 = ½ (approx.) | .1492 |
| 15/64 = ¼ (approx.) | .0746 |

TABLE II

*Rotational speed of capstan gear*

1 INCH PITCH DIAMETER

[Motor speed 3500 r.p.m.=58.33 r.p.s.]

| Worm Wire Size | | Number Gear Teeth | Capstan, Revolutions/ Second |
|---|---|---|---|
| Steel Wire Gage # | Diam., Inches | | |
| 59 | .040 | 78.5398 | 0.743 |
| 57 | .042 | 74.7998 | 0.780 |
| 56 | .045 | 69.8132 | 0.836 |
| 55 | .050 | 62.8319 | 0.928 |
| 54 | .055 | 57.1199 | 1.022 |
| 52 | .063 | 49.8665 | 1.170 |
| 50 | .069 | 45.5303 | 1.281 |
| 48 | .075 | 41.6879 | 1.401 |

For a number 50 steel wire of diameter $d=0.069$ inch and number of gear teeth, $n=48$ by proportion pitch diameter of gear 12 (Table II) is $2r=1.055$. Adding and subtracting $d=.069$ inch it is found that root and tooth tip diameters of gear 12 are 0.986 inch and 1.124 inch respectively. With a pitch diameter of spring 10 (See FIGURE 4) of $D=0.264$ inch (adding and subtracting $D=0.69$ inch) the inside and outside clear diameters of spring 10 are 0.195 inch and 0.333 inch respectively. Finally, $r$ and $R$ of FIGURE 4 are determined to be 0.5275 inch and 0.826 inch, respectively.

With a motor shaft speed of 7000 r.p.m., a capstan rotational speed of 2.43 r.p.s. is obtained with a gear ratio of 48. Referring now to Table I and proportioning for 7.5 inch per second tape speed, the diameter of the capstan drive is $(2.3873/2.43) \times 1 = 0.980$ inch. Based on the foregoing, the following significant gear reductions are illustrated for various tape speeds in the Table III below.

TABLE III

| Tape Speed (inches per second) | 7.5 | 3.75 | 1⅞ | 1⁵⁄₁₆ |
|---|---|---|---|---|
| Motor Speed (revolutions per minute) | 7,000 | 3,500 | 1,750 | 875 |

In combination with motor winding changes (two speed motors) and/or frequency multiplying transformers in the supply circuit, the above example illustrates how several desired changes in tape speed could be obtained by electrical switching instead of mechanical gear shift or changes of capstan diameters.

Obviously, modifications will occur to those in this art without departing from the novel spirit and scope of this invention. For example, pin 15 and rod 19 may be cut with double, triple or multiple threads with spring 10 correspondingly doubly, triply or multipally wound, i.e., the interleaving of several coils to form the worm. In this manner, with the proper mating gear 12, the gear ratio is proportionately reduced. It should be emphasized that although the invention was described with reference to a capstan drive application, toys, electric clocks, disk phonograph players, angular take-offs and situations where gear wheels and their shafts otherwise would interfere as well as many places where torques are small and desired gear ratios are large are other areas where this invention is applicable. Accordingly, it is intended that this invention be limited only by the scope of the appended claims.

I claim as my invention:

1. A flexible worm gear drive system comprising in combination:

a housing adapted to receive driving means;

driving means consisting of a coiled metal member nested into said housing in a curved cavity provided therefor with said driving means terminating in a thrust bearing in the housing;

a resilient gear operatively engaging with said driving means terminating in a thrust bearing in the housing;

coupling means connected to the driving means for transferring rotational power thereto;

said coupling means adapted for connection to a power source; and said gear adapted for connection to a driven load device.

2. A flexible worm gear drive comprising in combination:

a housing adapted to receive a driving means;

driving means consisting of a coiled metal member journaled into said housing in a curved passage provided therefor with said driving means terminating in thrust bearings in the housing;

a resilient gear meshing with said driving means in mating fashion;

coupling means connected to said driving member for rotation thereof; and said coupling means adapted for connection to a power source.

3. A flexible worm gear drive comprising in combination:

a housing adapted to receive a driving member;

a driving member consisting of a coiled elongate element journaled into a curved passage in said housing to fix its position therein;

thrust bearings cooperating with said driving member in fixed relation therewith;

a circumferentially resilient gear driven by and mating with said driving member;

means connected to said driving member for rotation thereof; and said means adapted for connection to a power source.

4. A flexible worm gear drive comprising in combination:

a housing adapted to receive a driving member;

a driving member consisting of a helically coiled elongate element journaled into a curved passage in said housing to fix its position therein;

a thrust bearing cooperating with said driving member and seated in said housing;

a resilient gear operatively associated with said driving member and mating with said element in concentric relation;

means connected to said driving member for rotation thereof; and said means adapted for connection to a power source.

5. A flexible worm gear drive comprising in combination:

a housing adapted to receive a driving member;

a driving member consisting of a coiled elongate element journaled into a curved cavity in said housing to fix its position therein;

thrust bearings cooperating with said driving member in fixed relation therewith;

a resilient gear operatively associated with said driving member and mating with said element in concentric relation;

means passing into a linear portion of said housing and interiorly of said driving member for rotation thereof; and said means adapted for connection to a power source.

6. A flexible worm gear drive comprising in combination:

a housing adapted to receive a driving member;

a driving member consisting of a coiled elongate element journaled into a curved passage in said housing to fix its position therein;

thrust bearings cooperating with said driving member in fixed relation therewith;

a resilient gear operatively associated with said driving member and mating with said element in concentric relation;

means connected to said driving member interiorly thereof for rotation of said member; and said means adapted for connection to a power source.

7. A flexible worm gear drive comprising in combination:
a housing adapted to receive a driving member;
a driving member consisting of a coiled elongate element journaled into a curved passage in said housing to fix its position therein;
thrust bearings cooperating with said driving member in fixed relation therewith;
a resilient gear operatively associated with said driving member and mating with said element in concentric relation;
means passing into a linear portion of said housing and into a linear section of said driving member; and
said means adapted for connection to a power source to couple rotational motion to said element which element drives said gear.

8. A flexible worm gear drive comprising in combination:
a housing adapted to receive a driving member;
a driving member consisting of a coiled elongate element journaled into a curved passage in said housing to fix its position therein;
thrust bearings cooperating with said driving member in fixed relation therewith;
a resilient gear operatively associated with said driving member and mating with said element in concentric relation;
first means passing into a linear portion of said housing and into a linear section of said driving member for rotation thereof;
second means retaining said element in the housing but permitting conjoint rotation of said element and said first means; and
said first means adapted for connection to a power source.

9. A flexible worm gear drive comprising in combination:
a housing adapted to receive a driving member;
a driving member consisting of a coiled elongate element journaled into a curved passage in said housing to fix its position therein;
a first thrust bearing cooperating with said driving member and seated in said housing;
a resilient gear operatively associated with said driving member and mating with said element in concentric relation;
means passing into a linear portion of said housing and into a linear section of said driving member for rotation thereof;
a second thrust bearing retaining said element in the housing but permitting conjoint rotation of said element and said means; and
said means adapted for connection to a power source.

10. A flexible worm gear drive comprising in combination:
a housing adapted to receive a driving member;
a driving member consisting of a coiled elongate metal element journaled into a curved passage in said housing to fix its position therein;
a first thrust bearing cooperating with said driving member and seated in said housing;
a resilient gear operatively associated with said driving member and mating with said element in concentric relation;
means passing into a linear portion of said housing and into a linear section of said driving member for rotation thereof;
a second thrust bearing engaging said element but permitting conjoint rotation of said element and said first means; and
said means adapted for connection to a power source.

11. A flexible worm gear drive comprising in combination:
a housing adapted to receive a driving member;
a driving member consisting of a coiled elongate element journaled into a curved passage in said housing to fix its position therein;
a first thrust bearing cooperating with said driving member and seated in said housing;
a resilient gear operatively associated with said driving member and mating with said element in concentric relation;
means passing into a linear portion of said housing and into a linear section of said driving member for rotation thereof;
a second thrust bearing engaging said element through a tapered hollow bore therein but permitting conjoint rotation of said element and said means; and
said means adapted for connection to a power source.

12. A flexible worm gear drive comprising in combination:
a housing adapted to receive a driving member;
a driving member consisting of a coiled elongate metal element nested in a curved cavity in said housing to fix its position therein;
a first thrust bearing cooperating with said driving member and seated in said housing;
a circumferentially resilient gear operatively associated with said driving member and mating with said element in concentric relation;
means passing into a linear portion of said housing and into a linear section of said driving member for rotation thereof;
a second thrust bearing engaging said element through a tapered hollow bore therein but permitting conjoint rotation of said element and said means; and
said first means adapted for connection to a power source.

13. A flexible worm gear drive comprising in combination:
a housing adapted to receive a driving member;
a driving member consisting of a coiled elongate metal element nested in a curved cavity in said housing to fix its position therein;
a first thrust bearing cooperating with said driving member and seated in said housing;
a circumferentially resilient gear operatively associated with said driving member and mating with said element in concentric relation;
means passing into a linear portion of said housing and into a linear section of said driving member for rotation thereof;
a second thrust bearing retaining said element in the housing through a tapered hollow bore but permitting conjoint rotation of said element and said means wherein the tapered bore of said second bearing urges said element against said means to insure intimate contact therebetween; and
said means adapted for connection to a power source.

14. A flexible worm gear drive comprising in combination:
first means adapted to receive a driving member in a substantially circular recess contained therein;
a driving member consisting of a coiled elongate element journaled into said recess whereby the innermost portions of the coils of said element in the recess contact each other;
a first thrust bearing operatively connected to a terminal end of said element in said recess to fix the position of said element with said bearing seated in said first means;
a circumferentially resilient gear operatively engaging and mating with said element interiorly thereof and concentric therewith;
second means passing into a linear portion of said first means and into a linear section of said driving member for rotation thereof;

a second thrust bearing connected to said coupling means and said element through a threaded tapered bore passing therethrough with said taper bearing against bearing against said element to insure driving engagement between said element and said coupling means; and said second means adapted for connection to a power source.

15. A flexible worm gear drive comprising in combination a housing to receive a driving member, said housing having an internal cavity a portion of which is torroidally shaped to receive a driving member;

a flexible coiled worm driving member journaled into said cavity in said housing so as to assume circular curvature of its axis over a substantial fraction of a complete circular arc but with linear end sections whereby the coil turns are mutually contacting on the inside of the bend;

a gear wheel in mesh with said flexible coil driving member making tooth-to-coil-turn gear contact along two pitch circles at radii greater than the inside bend radius of said circularly bent flexible driving worm at which pitch circle position the turns of the coiled driving member are non contacting to provide circumferential resilience between said driving worm and the gear wheel;

thrust bearings cooperating with said driving member at each end thereof;

means passing into a linear end section of said driving member to couple rotational motion thereto; and said means adapted for connection to a power source.

16. A flexible worm gear drive comprising in combination:

a housing to receive a driving member, said housing having an internal cavity a portion of which is torroidally shaped and continuous with generally circular reversed arcs to receive a driving member;

a flexible coiled worm driving member journaled into said cavity in said housing so as to assume circular curvature of its axis over a substantial fraction of said reversed circular arcs but with linear end sections whereby the coiled turns are mutually contacting on the inside of the bends;

gear means in mesh with said flexible coil driving member making tooth-to-coil-turn gear contact along the inside bend radii of said circularly bent flexible driving worm;

thrust bearings cooperating with said driving member at each end thereof;

means passing into a linear end section of said driving member to couple rotational motion thereto; and said means adapted for connection to a power source.

17. A flexible worm gear drive as recited in claim 14 wherein said coiled elongate element has a transverse cross section which is generally triangular with rounded corners.

References Cited by the Examiner
UNITED STATES PATENTS

| | | | |
|---|---|---|---|
| 511,269 | 12/1893 | Holmes | 74—458 X |
| 2,635,479 | 4/1953 | Ubertini | 74—458 X |
| 2,682,176 | 6/1954 | Fagley et al. | 74—458 |
| 2,850,914 | 9/1958 | Duff | 74—458 |
| 3,115,614 | 12/1963 | Habereder | 74—425 X |

FOREIGN PATENTS

| | | |
|---|---|---|
| 253,658 | 8/1911 | Germany. |

DON A. WAITE, *Primary Examiner.*